(12) United States Patent
Sandey et al.

(10) Patent No.: US 8,911,154 B2
(45) Date of Patent: Dec. 16, 2014

(54) SHOULDERLESS TOLERANCE RING

(71) Applicants: Adam Sandey, Somerset (GB); Llewelyn Pickering, Clydach Monmouthshire (GB)

(72) Inventors: Adam Sandey, Somerset (GB); Llewelyn Pickering, Clydach Monmouthshire (GB)

(73) Assignee: Saint-Gobain Performance Plastics Rencol Limited, Coventry (GB)

( * ) Notice: Subject to any disclaimer, the term of this patent is extended or adjusted under 35 U.S.C. 154(b) by 0 days.

(21) Appl. No.: 13/974,685

(22) Filed: Aug. 23, 2013

(65) Prior Publication Data

US 2014/0056549 A1 Feb. 27, 2014

Related U.S. Application Data

(60) Provisional application No. 61/692,645, filed on Aug. 23, 2012.

(51) Int. Cl.
| | | |
|---|---|---|
| F16C 27/00 | (2006.01) | |
| B62D 3/12 | (2006.01) | |
| F16C 35/02 | (2006.01) | |

(52) U.S. Cl.
CPC .. F16C 35/02 (2013.01); B62D 3/12 (2013.01)
USPC .......................................... 384/535; 384/581

(58) Field of Classification Search
USPC ......... 384/202, 215, 280, 282, 535, 536, 581; 403/365, 366, 371, 372
See application file for complete search history.

(56) References Cited

U.S. PATENT DOCUMENTS

| | | | |
|---|---|---|---|
| 3,197,243 | A | 7/1965 | Brenneke |
| 8,052,406 | B2 | 11/2011 | Li et al. |
| 2008/0038090 | A1 | 2/2008 | Figge et al. |
| 2008/0115357 | A1 | 5/2008 | Li et al. |
| 2008/0247815 | A1 | 10/2008 | Slayne et al. |
| 2012/0087044 | A1 | 4/2012 | Schmidt et al. |

FOREIGN PATENT DOCUMENTS

| | | |
|---|---|---|
| DE | 29509851 U1 | 9/1995 |
| DE | 102007039238 A1 | 2/2009 |
| EP | 1500573 A1 | 1/2005 |
| WO | 2009024377 A2 | 2/2009 |

OTHER PUBLICATIONS

International Search Report for PCT/EP2013/067572, dated Apr. 23, 2014, 1 page.

*Primary Examiner* — Phillip A Johnson
(74) *Attorney, Agent, or Firm* — Chi Suk Kim; Abel Law Group, LLP

(57) ABSTRACT

A tolerance ring can include a generally cylindrical body that can include a sidewall that defines a top and a bottom. The sidewall can include an upper unformed band and a lower unformed band opposite the upper unformed band. A plurality of shoulderless wave structures can protrude radially from the sidewall between the upper unformed band and the lower unformed band. Each shoulderless wave structure can be connected only to the upper unformed band and the lower unformed band. The sidewall of the tolerance ring can also include a plurality of unformed sections and a gap that extends along the entire axial length of the body. Each unformed section can be located between a pair of adjacent shoulderless wave structures. Moreover, the gap can establish a split in the body.

20 Claims, 6 Drawing Sheets

FIG. 7

SHOULDERLESS TOLERANCE RING

CROSS-REFERENCE TO RELATED APPLICATION(S)

This application claims priority under 35 U.S.C. §119(e) to U.S. Patent Application No. 61/692,645, entitled "SHOULDERLESS TOLERANCE RING," by Adam Sandey and Llewelyn Pickering, filed Aug. 23, 2012, which is assigned to the current assignee hereof and incorporated herein by reference in its entirety.

BACKGROUND

1. Field of the Disclosure

The present disclosure is directed to tolerance rings, particularly to tolerance rings for steering systems, such as rack and pinion steering systems.

2. Description of the Related Art

The present disclosure relates to tolerance ring assemblies, wherein a tolerance ring provides an interference fit between parts of an assembly, in which a first part has a cylindrical portion located in a cylindrical bore of a second part. In particular, the present disclosure relates to assemblies having a tolerance ring that provides an interference fit between a cylindrical component such as a bearing and a housing for the bearing.

Improved engineering techniques have resulted in the need for greater accuracy of machine parts, raising manufacturing costs. Very close tolerances are required where press fits, splines, pins or keyways are employed to transmit torque in applications such as pulleys, flywheels, rotors, or drive shafts, or to prevent relative motions between parts, such as stators, main frames, lower frames, and compressor housings.

Tolerance rings may be used to provide an interference fit between parts required to transmit torque. Tolerance rings provide an efficient means of providing an interference fit between parts that may not be machined to exact dimensions. Tolerance rings have a number of other potential advantages, such as compensating for different linear coefficients of expansion between the parts, allowing rapid apparatus assembly, and durability.

A tolerance ring generally comprises a strip of resilient material, for example a metal such as spring steel, the ends of which are brought together to form a ring. A band of protrusions extend radially outwards from the ring, or radially inwards towards the center of the ring. Usually, the protrusions are formations, possibly regular formations, such as corrugations, ridges or waves.

When the ring is located in the annular space between, for example, a bearing and a bore in a housing in which the bearing is located, the protrusions are compressed. Each protrusion acts as a spring and exerts a radial force against the bearing and the surface of the bore, providing an interference fit between the bearing and the housing. A sliding shaft can be free to move axially through the bearing while the bearing remains securely installed within the housing.

Although tolerance rings usually comprise a strip of resilient material that is curved to allow the easy formation of a ring by overlapping the ends of the strip, a tolerance ring may also be manufactured as an annular band. The term "tolerance ring" as used hereafter includes both types of tolerance ring.

Accordingly, the industry continues to need improvements in tolerance rings, particularly tolerance rings installed within steering assemblies.

BRIEF DESCRIPTION OF THE DRAWINGS

The present disclosure can be better understood, and its numerous features and advantages made apparent to those skilled in the art by referencing the accompanying drawings.

FIG. 7 includes another graph representing comparison test data for a tolerance ring in accordance with an embodiment.

The use of the same reference symbols in different drawings indicates similar or identical items.

DETAILED DESCRIPTION

The following description is directed to tolerance rings, and particularly, to tolerance rings that can be installed within a steering assembly between a bearing for a sliding shaft and a housing. In one aspect, a tolerance ring can be fitted around a bearing and the bearing/tolerance ring assembly can be pressed into a housing. A shaft can then be fitted into the bearing. The tolerance ring can hold the bearing stationary within the housing and the shaft can slide relative to the housing and the bearing within the bearing. The tolerance ring can also provide a biasing force to maintain a steering rack affixed to the shaft in engagement with a pinion gear affixed to a steering shaft.

Figure 1:
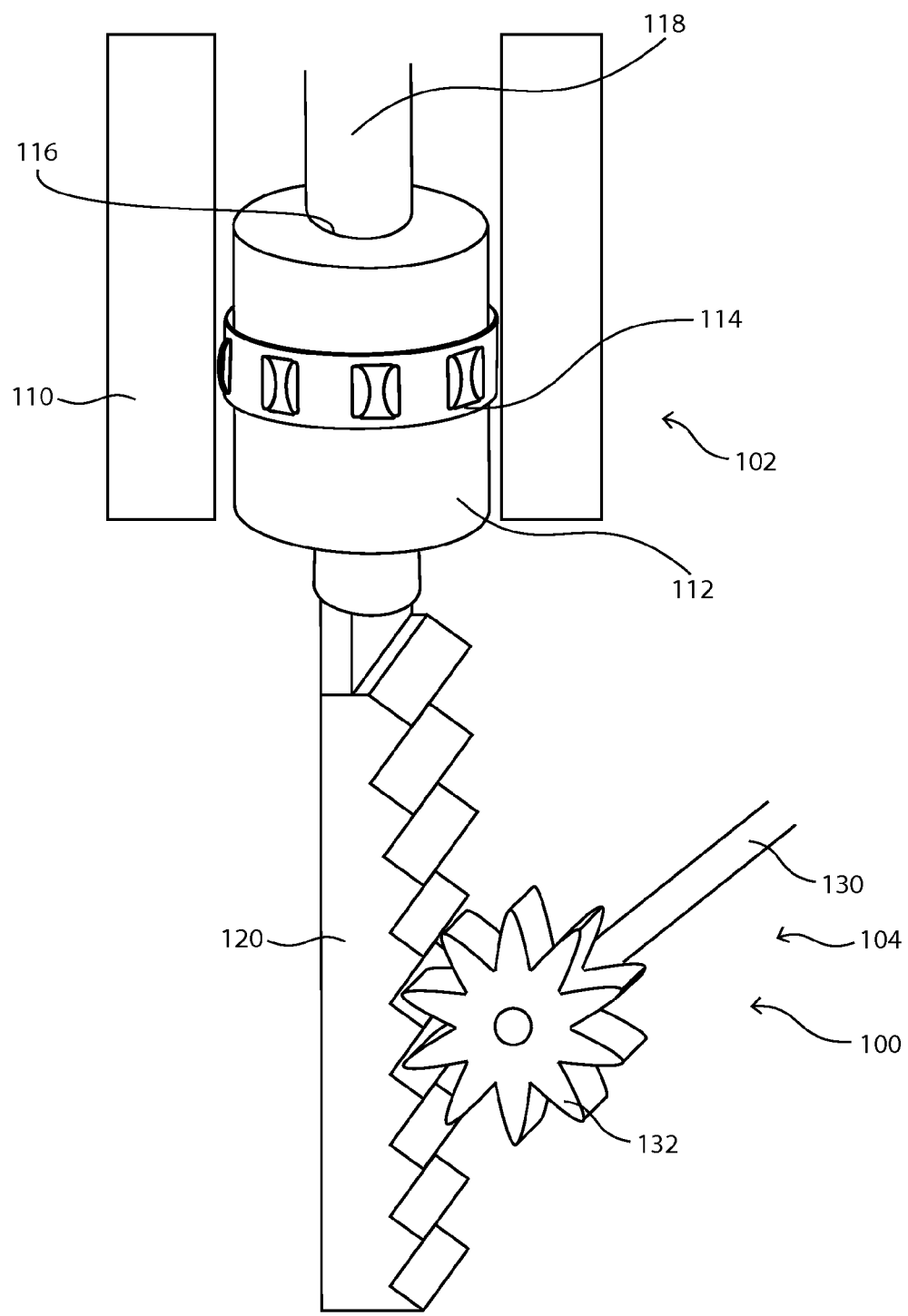
FIG. 1 includes a partial view of a steering assembly in accordance with an embodiment.

Referring initially to FIG. 1, a portion of a steering assembly is shown and is generally designated 100. The steering assembly 100 can include a rack assembly 102 and a pinion assembly 104 engaged with the rack assembly 102 as described in greater detail below.

The rack assembly 102 can include a generally cylindrical housing 110. At least one rack shaft bearing 112 can be installed within the housing 110. A tolerance ring 114 can be installed around the rack shaft bearing 112 between the rack shaft bearing 112 and the housing 110 in order to provide an interference fit between the rack shaft bearing 112 and the housing 110. The rack shaft bearing 112 can be formed within an offset hole 116 and a rack shaft 118 can be installed through the offset hole 116 of the rack shaft bearing 112. One end of the rack shaft 118 can be coupled to a rack gear 120, or integrally formed therewith, and another end of the rack shaft 118 can be connected to a tie rod assembly, a steering knuckle assembly, a wheel assembly, or another steering component (not shown).

As illustrated, the pinion assembly 104 can include a steering shaft 130. One end of the steering shaft 130 can include a pinion gear 132 and the other end of the steering shaft 130 can be coupled directly or indirectly to a steering wheel (not shown). The steering shaft 130 can be located within a generally cylindrical housing (not shown) that extends from a steering box (not shown).

In a particular aspect, the pinion gear 132 can be engaged with the rack gear 120. As a driver rotates the steering wheel (not shown), the steering shaft 130 and the pinion gear 132 can rotate. As the pinion gear 132 rotates, the rack gear 120 can move linearly with respect to the rotating pinion gear 132. The rack gear 120 can cause the rack shaft 118 to move linearly within the housing 110. Specifically, the rack shaft 118 can slide linearly within the rack bearing 112 within the housing 110. The radial placement of the rack bearing 112 within the housing 110 in conjunction with the tolerance ring 114 can provide a biasing force in the direction of arrow 140. The biasing force can maintain the rack gear 120 in engagement with the pinion gear 132.

Referring now to FIG. 2 through FIG. 5, an exemplary tolerance ring is illustrated and is generally designated 200. The tolerance ring 200 depicted in FIG. 2 through FIG. 5 can be used in the steering assembly 100 described above. Further, similar or dissimilar tolerance rings can be used throughout the compressor assembly 100.

Figure 2:
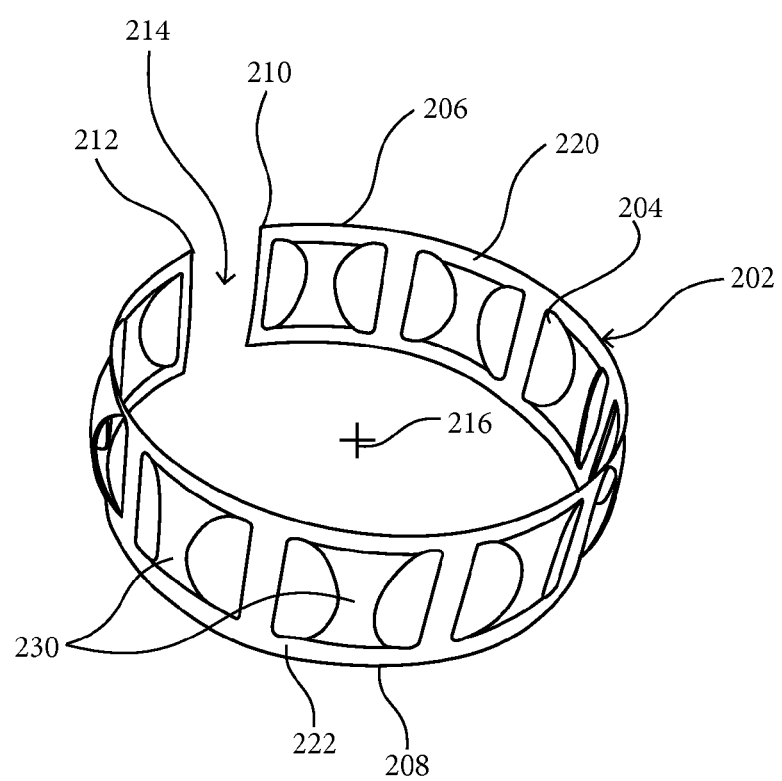
FIG. 2 includes a perspective view of a tolerance ring in accordance with an embodiment.
Figure 3:
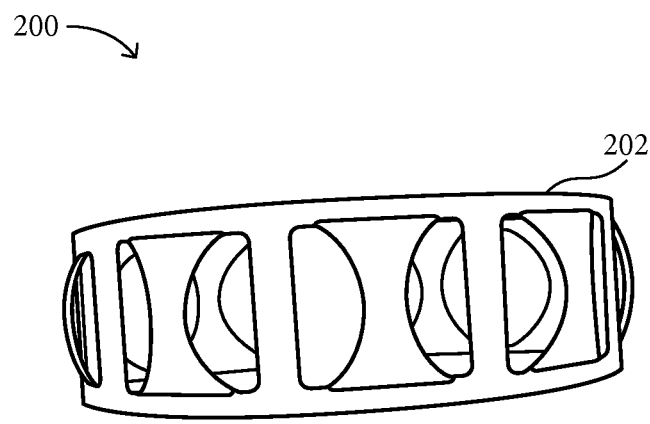
FIG. 3 includes a plan view of a tolerance ring in accordance with an embodiment.

As depicted in FIG. 2 through FIG. 5, the tolerance ring 200 can include a generally cylindrical body 202 having a generally cylindrical sidewall 204. The sidewall 204 can include a top 206 and a bottom 208. Further, the sidewall 204 can include a first end 210 and a second end 212. Moreover, a gap 214 can be established between the first end 210 and the second end 212 of the sidewall 204. The gap 214 can extend completely through the sidewall 204 in order to form a split in the sidewall 204 and the tolerance ring 200. As illustrated in FIG. 2, the tolerance ring 200 can include a center 216.

The sidewall 204 of the tolerance ring 200 can include an upper unformed band 220 near, or adjacent to, the top 206 of the sidewall 204. The sidewall 204 can also include a lower unformed band 222 near, or adjacent to, the bottom 208 of the sidewall 204 opposite the upper unformed band 220. Unformed sections 224 can extend axially along the length of the sidewall 204 between, and extending from, the unformed bands 220, 222.

As illustrated in FIG. 2 through FIG. 5, the tolerance ring 200 can include a plurality of shoulderless wave structures 230 formed in the sidewall 204. The wave structures 230 can protrude radially outward, or inward, from the sidewall 204 away from, or toward, a center of the tolerance ring 200.

Each shoulderless wave structure 230 may be connected only to the upper unformed band 220 and the lower unformed band 222 such that the sides of the shoulderless wave structures 230 are open and do not include shoulders that connect the wave structures 230 to the sidewall 204, e.g., to the unformed sections 224 adjacent to the wave structures 230. As shown, each unformed section 224 is located between adjacent wave structures 230 and each wave structure 230 is located between adjacent unformed sections 224 so the wave structures 230 and unformed sections 224 alternate around a circumference of the sidewall 204.

As depicted, the tolerance ring 200 can include one row, or band, of wave structures. In other aspects, the tolerance ring 20 can include two rows, or bands, of wave structures; three rows, or bands, of wave structures; etc. Further, a total number of wave structures, $N_{WS}$, in each row can be $\geq 3$, such as $\geq 4$, $\geq 5$, $\geq 6$, $\geq 7$, $\geq 8$, or $\geq 9$. Further, $N_{WS} \leq 30$, $\leq 25$, $\leq 20$, or $\leq 15$. $N_{WS}$ can be within a range between and including any of the $N_{WS}$ values above.

Figure 4:
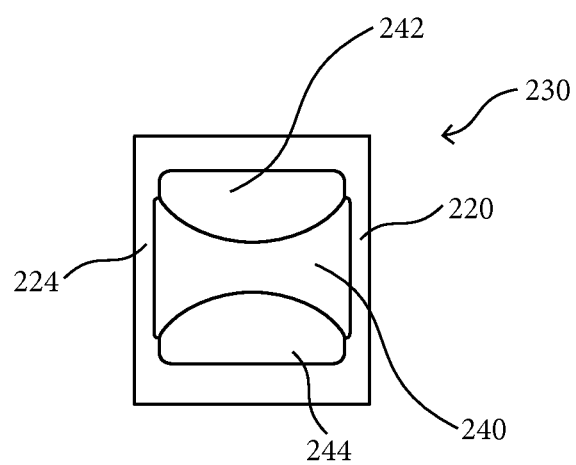
FIG. 4 includes a partial plan view of an end of a tolerance ring in accordance with an embodiment.

As illustrated in FIG. 4, each wave structure 230 can include a wave body 240, a first wave cutout 242 on a first side of the wave body 240 and a second wave cutout 244 on a second side of the wave body opposite first wave cutout. Each wave body 240 can include a generally arch shaped structure that extends between the upper unformed band 220 and the lower unformed band 222.

In a particular aspect, each cutout 242, 244 can extend from the upper unformed band 220 to the lower unformed band 222. In another aspect, each cutout 242, 244 can extend at least partially into the upper unformed band 220 and at least partially into the lower unformed band 220.

Specifically, the upper unformed band 220 and the lower unformed band 222 can include a first height, $H_{UB1}$, that is measured between a first interface with the wave body 240 and a nearest end 206, 208 of the sidewall 204, and a second height, $H_{UB2}$, measured between a second interface with a cutout 240, 242 and a nearest end 206, 208 of the sidewall 204. $H_{UB2}$ can be $\leq H_{UB1}$, such as $\leq 99\% H_{UB1}$, $\leq 98\% H_{UB1}$, $\leq 97\% H_{UB1}$, $\leq 96\% H_{UB1}$, or $\leq 95\% H_{UB1}$. Further, $H_{UB2}$ can be $\geq 75\%$ $H_{UB1}$, $H_{UB2} \geq 80\%$ $H_{UB1}$, $H_{UB2} \geq 85\%$ $H_{UB1}$, or $H_{UB2} \geq 90\%$ $H_{UB1}$. Moreover, $H_{UB2}$ can be within a range between and including any of the % $H_{UB1}$ values.

Figure 5:
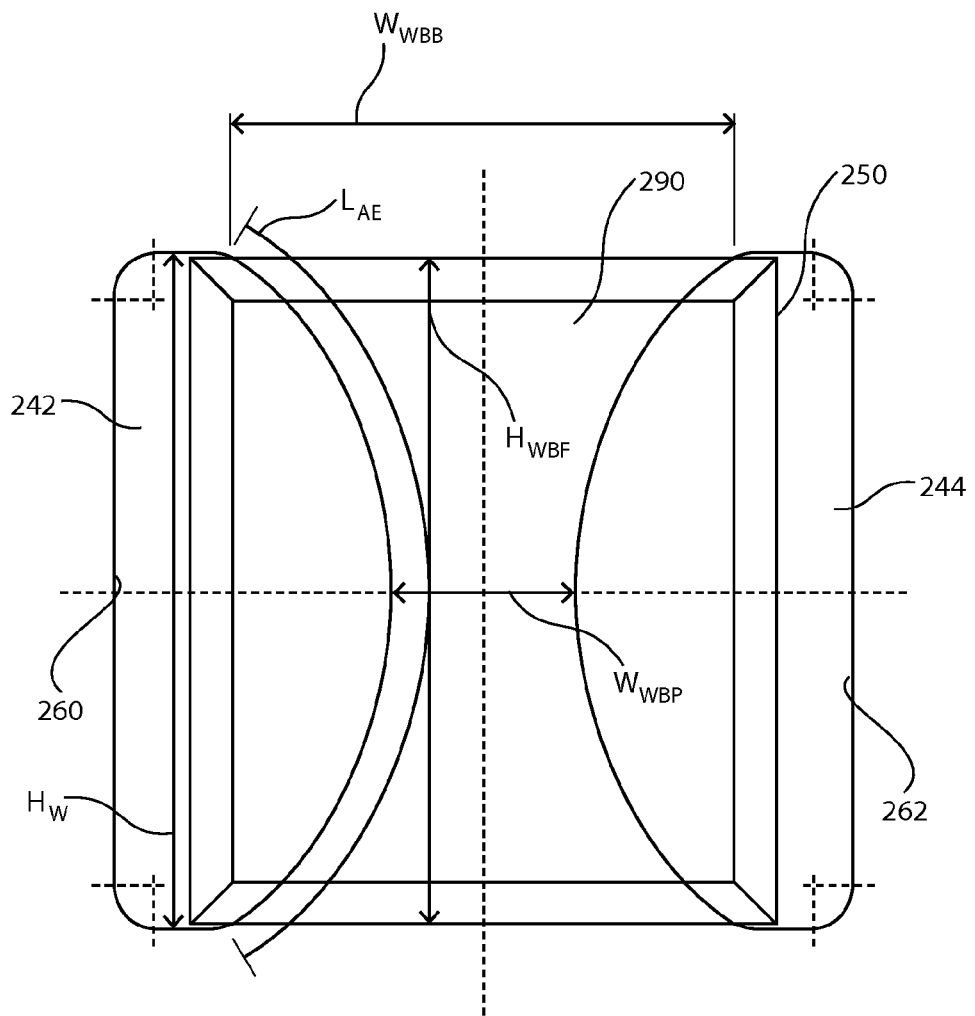
FIG. 5 includes a plan view of a wave structure for a tolerance ring in accordance with an embodiment.

As best depicted in FIG. 5, each wave body 240 can include a generally rectangular footprint 250 that represents the outer perimeter, or shape, of the wave body 240 prior to the formation of the wave cutouts 242, 244. The footprint 250 is surrounded by the unformed bands 220, 222 and adjacent unformed sections 224. The footprint 250 can have a footprint height, $H_{WBF}$, and a footprint width, $W_{WBF}$.

Each cutout 242, 244 can include a height, $H_{CO}$. $H_{CO}$ can be $\geq H_{WBF}$, such as $\geq 101\%$ $H_{WBF}$, $\geq 102\%$ $H_{WBF}$, $\geq 103\%$ $H_{WBF}$, $\geq 104\%$ $H_{WBF}$, or $\geq 105\%$ $H_{WBF}$. $H_{CO}$ can also be $\leq 125\%$ $H_{WBF}$, such as $\leq 120\%$ $H_{WBF}$, $\leq 115\%$ $H_{WBF}$, or $\leq 110\%$ $H_{WBF}$. Further, $H_{CO}$ can be within a range between and including any of the % $H_{WBF}$ values.

The cutouts 242, 244 can include an overall cutout width, $W_{OCO}$, measured between an outermost vertical edge 260 of the first cutout 242 and an outermost vertical edge 262 of the second cutout 244. $W_{OCO}$ can be $\geq W_{WBF}$, such as $\geq 101\%$ $W_{WBF}$, $\geq 102\%$ $W_{WBF}$, $\geq 103\%$ $W_{WBF}$, $\geq 104\%$ $W_{WBF}$, or $\geq 105\%$ $W_{WBF}$. Moreover, wherein $W_{OCO}$ is $\leq 150\%$ $W_{WBF}$, such as $\leq 145\%$ $W_{WBF}$, $\leq 140\%$ $W_{WBF}$, $\leq 135\%$ $W_{WBF}$, $\geq 130\%$ $W_{WBF}$, or $\leq 125\%$ $W_{WBF}$. Further, $W_{OCO}$ can be within a range between and including any of the % $W_{WBF}$ values.

In a particular aspect, as illustrated in FIG. 5, each wave body comprises a base width, $W_{WBB}$, measured at an interface of each wave body 240 and the upper unformed band 220 or the lower unformed band 222, and a peak width, $W_{WBP}$, measured at a peak of each wave body 240. $W_{WBF}$ can be $\leq W_{WBB}$, such as $\leq 75\%$ $W_{WBB}$, $\leq 70\%$ $W_{WBB}$, $\leq 65\%$ $W_{WBB}$, $\leq 60\%$ $W_{WBB}$, $\leq 55\%$ $W_{WBB}$, or $\leq 50\%$ $W_{WBB}$. In another aspect, $W_{WBF}$ can be $\geq 25\%$ $W_{WBB}$, such as $\geq 30\%$ $W_{WBB}$, $\geq 35\%$ $W_{WBB}$, or $\geq 40\%$ $W_{WBB}$. Moreover, $W_{WBF}$ can be within a range between and including any of the 5% $W_{WBB}$ values.

The footprint 250 of the wave body 240 can include an area, $A_{FP}$, that is equal to, $H_{WBF} \times W_{WBF}$. The first cutout 242 and the second cutout 244 together can include a total cutout area, $A_{TCO}$, that is equal to the surface area of the material removed from the unformed section 224 and the wave body 240 at each wave structure 230. $A_{TCO}$ can be $\leq A_{FP}$, such as $\leq 80\% A_{FP}$, $\leq 75\% A_{FP}$, $\leq 70\% A_{FP}$, $\leq 65\% A_{FP}$, or $\leq 60\% A_{FP}$. In another aspect, $A_{TCO}$ can be $\geq 25\% A_{FP}$, $\geq 30\% A_{FP}$, $\geq 35\% A_{FP}$, $\geq 40\% A_{FP}$, $\geq 45\% A_{FP}$, or $\geq 50\% A_{FP}$. Further, $A_{TCO}$ can be within a range between and including any of the % $A_{FP}$ values.

In another aspect, $A_{TCO}$ comprises an area that overlaps the wave body footprint, $A_{OFP}$, and an area that overlaps one or more unformed sections, the upper unformed band, the lower unformed band, or a combination thereof, $A_{OU}$. $A_{OU}$ can be $\leq A_{OFP}$, such as $\leq 45\% A_{OFP}$, $\leq 40\% A_{OFP}$, $\leq 35\% A_{OFP}$, $\leq 30\% A_{OFP}$, or $\leq 25\% A_{OFP}$. Moreover, $A_{OU}$ can be $\geq 1\% A_{OFP}$, such as $\geq 2\% A_{OFP}$, $\geq 3\% A_{OFP}$, $>4\% A_{OFP}$, or $\geq 5\% A_{OFP}$. $A_{OU}$ can be within a range between and including any of the % $A_{OFP}$ values.

In yet another aspect, $A_{OU}$ can be $\leq A_{TCO}$, such as $\leq 30\%$ $A_{TCO}$, $\leq 25\%$ $A_{TCO}$, $\leq 20\%$ $A_{TCO}$, or $\leq 15\%$ $A_{TCO}$. Also, $A_{OU}$ can be ≥1% $A_{TCO}$, such as ≥2% $A_{TCO}$, ≥3% $A_{TCO}$, ≥4% $A_{TCO}$, or ≥5% $A_{TCO}$. $A_{OU}$ can be within a range between and including any of the % $A_{TCO}$ values.

In another aspect, $A_{OFP}$ can be ≥70% $A_{TCO}$, such as ≥75% $A_{TCO}$, ≥80% $A_{TCO}$, or ≥85% $A_{TCO}$. Further, $A_{OFP}$ ≤$A_{TCO}$, such as ≤99% $A_{TCO}$, ≤98% $A_{TCO}$, ≤97% $A_{TCO}$, ≤96% $A_{TCO}$, or ≤95% $A_{TCO}$. $A_{OFP}$ can be within a range between and including and of the $A_{TCO}$ values.

FIG. 5 indicates that each cutout 242, 244 can include an inner arcuate edge 270, 272 that is adjacent to the wave body 240 and forms a first side edge and a second side edge of the wave body 240. Each arcuate edge 270, 272 can include an arc length, $L_{AE}$, and $L_{AE}$ can be ≥$H_{WBF}$, such as ≥101% $H_{WBF}$, ≥102% $H_{WBF}$, ≥103% $H_{WBF}$, ≥104% $H_{WBF}$, or ≥105% $H_{WBF}$. In another aspect, $L_{AE}$ can be ≤200% $H_{WBF}$, such as ≤175% $H_{WBF}$, ≤150% $H_{WBF}$, ≤145% $H_{WBF}$, ≤140% $H_{WBF}$, ≤135% $H_{WBF}$, ≤130% $H_{WBF}$, or ≤125% $H_{WBF}$. $L_{AE}$ can also be within a range between and including any of the % $H_{WBE}$ values.

In another aspect, each unformed section 224 can include a height, $H_{US}$, that is substantially the same as $H_{WBF}$. Each side edge of the wave structure 240 can include a height, $H_E$, that is substantially the same as $H_{CO}$. In this aspect, $H_E$ can be ≥60% $H_{US}$, such as ≥65% $H_{US}$, ≥70% $H_{US}$, ≥75% $H_{US}$, ≥80% $H_{US}$, ≥85% $H_{US}$, >90% $H_{US}$, >95% $H_{US}$, >96% $H_{US}$, ≥97% $H_{US}$, ≥98% $H_{US}$, ≥99% $H_{US}$, or ≥100% $H_{US}$. Further, $H_E$ can be ≤125% $H_{US}$, such as ≤120% $H_{US}$, ≤115% $H_{US}$, ≤110% $H_{US}$, ≤105% $H_{US}$, ≤104% $H_{US}$, ≤103% $H_{US}$, ≤102% $H_{US}$, or ≤101% $H_{US}$. $H_E$ can also be within a range between and including any of the % $H_{US}$ values.

In a particular aspect, each wave structure 230, or the wave body 240 thereof, can include a stiffness, $S_{SWS}$. $S_{SWS}$ can be ≤a stiffness, $S_{WS}$, of an identically size and shaped wave structure formed from the same material as the wave structure 230 and including shoulders. $S_{SWS}$ can be ≤25% $S_{WS}$, such as ≤20% $S_{WS}$, ≤15% $S_{WS}$, or ≤10% $S_{WS}$. Moreover, $S_{SWS}$ can be ≥1% $S_{WS}$, ≥2% $S_{WS}$, ≥3% $S_{WS}$, ≥4% $S_{WS}$, or ≥5% $S_{WS}$. $S_{SWS}$ can also be within a range between and including any of the % $S_{WS}$ values. Accordingly, the reduction in stiffness, $R_S$, of a wave structure that can be attributed to removing all or a portion of the shoulders of the wave structure can be ≥75%, such as ≥80%, ≥85%, or ≥90%. $R_S$ can also be ≤99%, such as ≤98%, ≤97%, ≤96%, or ≤95%.

In a particular aspect, each of the plurality of wave structures 230 can include a depth, $D_{WS}$, measured from an outer face of the sidewall 204 to the peak of each wave structure 230 (i.e., the peak of the wave body 240). Further, the tolerance ring 200 can include an outer diameter, $O_D$, based on the peaks of the wave structures 230. $D_{WS}$ can be ≤5% $O_D$, such as ≤4% $O_D$, ≤3% $O_D$, ≤2% $O_D$, or ≤1% V. $D_{WS}$ can be ≥0.1% $O_D$, such as ≥0.2% $O_D$, ≥0.3% $O_D$, ≥0.4% $O_D$, or ≥0.5% $O_D$. Moreover, $D_{WS}$ can be within a range between and including any of the % $O_D$ values.

The tolerance ring 200 can be utilized in an assembly that includes an outer component that has a bore formed within the outer component and an inner component disposed within the bore. The outer component can be a housing formed with a bore and the inner component can be a rack shaft bearing. Further, the tolerance ring 200 can be mounted between the inner component and the outer component.

As described in greater detail above, the tolerance ring 200 can include a generally cylindrical body having a sidewall that defines a top, and a bottom. The sidewall can include an upper unformed band and a lower unformed band opposite the upper unformed band. A plurality of shoulderless wave structures can protrude radially from the sidewall between the upper unformed band and the lower unformed band. Further, the sidewall can include a plurality of unformed sections and each unformed second can be located between a pair of adjacent shoulderless wave structures. The sidewall can also include a gap that extends axially along the length of the tolerance ring.

Each shoulderless wave structure can be connected only to the upper unformed band and the lower unformed band. In another aspect, each shoulderless wave structure can include a first side edge established by a first cutout extending along a first side of the wave structure and a second side edge established by a second cutout extending along a second side of the wave structure opposite the first side. The edges of the wave structure can include a height that can extend at least partially along the height of the adjacent unformed sections.

In each of the embodiments described herein, the wave structures and the component engagement structures can be evenly spaced around the circumference of the sidewall wall of the tolerance ring. However, these structures can be staggered so they get progressively closer or progressively farther apart. Further, these structures can be grouped and the groups can be evenly spaced around the circumference of the sidewall of the tolerance ring.

Moreover, in other aspects, depending on a particular application, a single tolerance ring can include any combination of inwardly and outwardly protruding wave structures.

In a particular aspect, a tolerance ring 200 described herein can be made from a metal, a metal alloy, or a combination thereof. The metal can include a ferrous metal. Further, the metal can include steel. The steel can include stainless steel, such as austenitic stainless steel. Moreover, the steel can include stainless steel comprising chrome, nickel, or a combination thereof. For example, the steel can X10CrNi18-8 1.4310 stainless steel. Further, the tolerance ring can include a Vickers pyramid number hardness, VPN, which can be ≥350, such as ≥375, ≥400, ≥425, or ≥450. VPN can also be ≤500, ≤475, or ≤450. VPN can also be within a range between, and including, any of the VPN values described herein. In another aspect, the tolerance ring can be treated to increase its corrosion resistance. In particular, the tolerance ring can be passivated. For example, the tolerance ring can be passivated according to the ASTM standard A967.

In another aspect, the stock material from which the tolerance ring 200 can be formed can have a thickness, T, and T can be ≥0.1 mm, such as ≥0.2 mm, ≥0.3 mm, ≥0.4 mm, ≥0.5 mm, or ≥0.6 mm. In another aspect, T can be ≤1.0 mm, ≤0.9 mm, or ≤0.8 mm. Moreover, T can be within a range between, and including, any of the values of T disclosed above.

Figure 6:
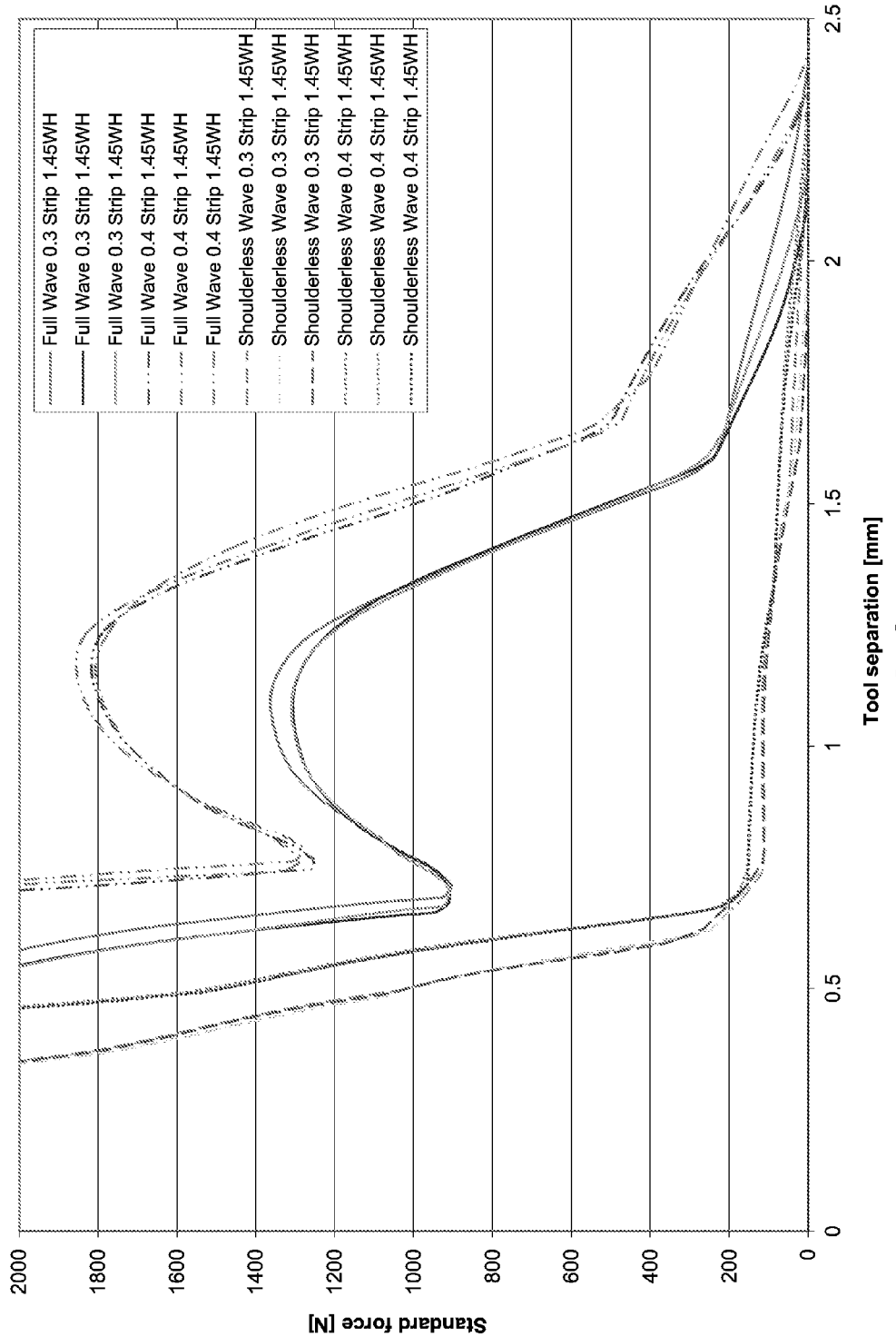
FIG. 6 includes a graph representing comparison test data for a tolerance ring in accordance with an embodiment.
Figure 7:
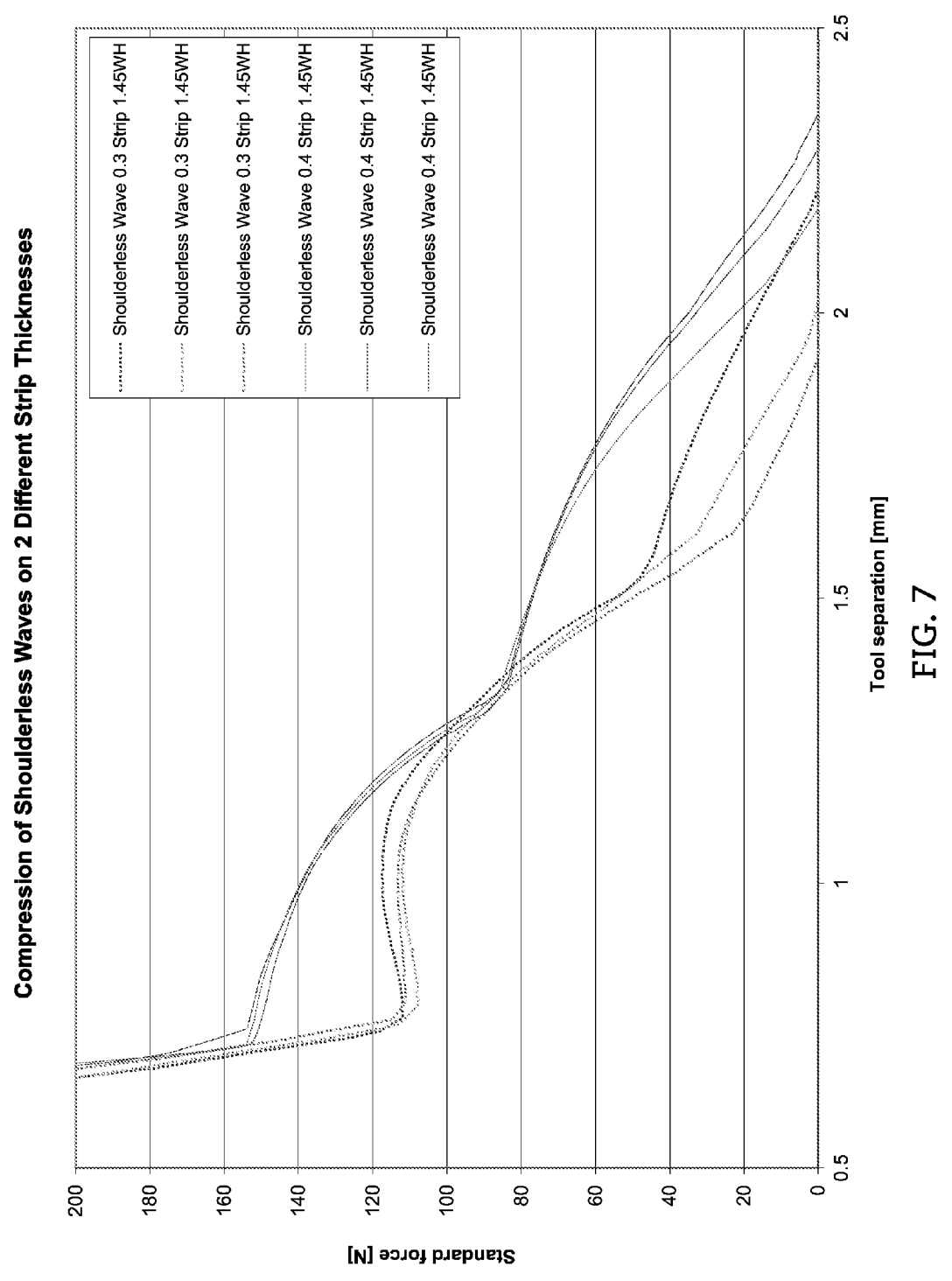

FIG. 6 and FIG. 7 depict the results of the tests. As shown, the stiffness of the wave structures that were formed without shoulders is substantially lower than the wave structures formed with shoulders.

Specifically, at a tool separation of approximately 0.75 mm, the average standard force of the first comparison waves, $FW_{0.4}$, is approximately 1300 N and the average standard force of the second comparison waves, $FW_{0.3}$, is approximately 1000 N. The average standard force of the first test waves, $FW_{0.4}$, is approximately 125 N and the average standard force of the second test waves, $FW_{0.3}$, is approximately 125 N.

At a tool separation of approximately 1.15 mm, the average standard force of the first comparison waves, $FW_{0.4}$, is approximately 1800 N and the average standard force of the second comparison waves, $FW_{0.3}$, is approximately 1300 N. The average standard force of the first test waves, $FW_{0.4}$, is approximately 115 N and the average standard force of the second test waves, $FW_{0.3}$, is approximately 115 N.

A tolerance ring manufactured according to one or more aspects disclosed herein can be fitted around an inner component such as a bearing. A housing can be placed over the inner component and the tolerance ring. The stiffness of the wave structures on the tolerance ring can establish an interference fit between the inner component and the housing. Accordingly, the tolerance ring can be sufficiently engaged with the inner component and the housing and the tolerance ring can prevent the inner component from rotating and translating with respect to the tolerance ring and the housing.

In a particular aspect, a tolerance ring according to one or more aspects described herein and the particular features thereof, e.g., the wave bodies and the wave cutouts, can be formed using a stamping/punching operation. A flat piece of sheet stock can be placed between a pair of molds having features that are shaped according to the desired features to be stamped and punched into the sheet stock (e.g., the various wave structure shapes and component engagement structure shapes described herein). After stamping, the stamped flat stock can be cut into strips and the strips can be rolled into tolerance rings having a generally cylindrical shape.

A skilled artisan may recognize other applications that may utilize a tolerance ring having one or more of the characteristics described herein.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:

1. A tolerance ring, comprising:
    a generally cylindrical body having a sidewall that defines a top, and a bottom, wherein the sidewall includes:
        an upper unformed band;
        a lower unformed band opposite the upper unformed band;
        a plurality of shoulderless wave structures protruding radially from the sidewall between the upper unformed band and the lower unformed band, wherein each shoulderless wave structure is connected only to the upper unformed band and the lower unformed band;
        a plurality of unformed sections, wherein each unformed section is located between a pair of adjacent shoulderless wave structures; and
        a gap extending along the entire axial length of the body, wherein the gap establishes a split in the body.

2. A tolerance ring, comprising:
    a generally cylindrical body having a sidewall that defines a top, and a bottom, wherein the sidewall includes:
        an upper unformed band;
        a lower unformed band opposite the upper unformed band;
        a plurality of unformed sections extending between the upper unformed band and the lower unformed band;
        a plurality of wave structures protruding radially from the sidewall between adjacent unformed sections wherein each wave structure includes a first side edge established by a first cutout extending along a first side of the wave structure and a second side edge established by a second cutout extending along a second side of the wave structure opposite the first side, wherein each edge has a height, $H_E$, and each unformed section has a height, $H_{US}$, and $H_E$ is ≥60% $H_{US}$; and
        a gap extending along the entire axial length of the body, wherein the gap establishes a split in the body.

3. An assembly, comprising:
    an outer component including a bore within the outer component;
    an inner component disposed within the bore; and
    a tolerance ring mounted between the inner component and the outer component, the tolerance ring comprising:
        a generally cylindrical body having a sidewall that defines a top, and a bottom, wherein the sidewall includes:
            an upper unformed band;
            a lower unformed band opposite the upper unformed band;
            a plurality of shoulderless wave structures protruding radially from the sidewall between the upper unformed band and the lower unformed band, wherein each shoulderless wave structure is connected only to the upper unformed band and the lower unformed band;
            a plurality of unformed sections, wherein each unformed section is located between a pair of adjacent shoulderless wave structures and between the upper unformed band and the lower unformed band; and
            a gap extending along the entire axial length of the body, wherein the gap establishes a split in the body.

4. The tolerance ring of claim 2, wherein $H_E$ is ≥65% $H_{US}$, or wherein $H_E$ is ≥125% $H_{US}$.

5. The tolerance ring of claim 1, wherein each wave structure extends radially outward from the sidewall.

6. The tolerance ring of claim 1, wherein each wave structure extends radially inward from the sidewall.

7. The tolerance ring of claim 1, wherein each wave structure comprises a wave body, a first wave cutout on a first side of the wave body and a second wave cutout on a second side of the wave body opposite first wave cutout.

8. The tolerance ring of claim 7, wherein each wave body comprise an arch extending between the upper unformed band and the lower unformed band.

9. The tolerance ring of claim 8, wherein each cutout extends from the upper unformed band to the lower unformed band.

10. The tolerance ring of claim 8, wherein each cutout extends at least partially into the upper unformed band and at least partially into the lower unformed band.

11. The tolerance ring of claim 7, wherein each wave body comprises a footprint having a height, $H_{WBF}$, and wherein each cutout comprises a height, $H_{CO}$, and wherein $H_{CO}$ is ≥$H_{WBF}$.

12. The tolerance ring of claim 11, wherein $H_{CO}$ is ≤125% $H_{WBF}$.

13. The tolerance ring of claim 7, wherein each wave body comprises a footprint width, $W_{WBF}$, and the first cutout and second cutout comprises an overall cutout width, $W_{OCO}$, measured between an outermost vertical edge of the first cutout and an outermost vertical edge the second cutout, and wherein $W_{OCO}$ is $\geq W_{WBF}$.

14. The tolerance ring of claim 13, wherein $W_{OCO}$ is $\leq 150\% \ W_{WBF}$.

15. The tolerance ring of claim 7, wherein each wave body comprises a base width, $W_{WBB}$, measured at an interface of each wave body and the upper unformed band or the lower unformed band, and a peak width, $W_{WBP}$, measured at a peak of each wave body, and wherein $W_{WBP} \leq W_{WBB}$.

16. The tolerance ring of claim 15, wherein $W_{WBP} \geq 25\% \ W_{WBB}$.

17. The tolerance ring of claim 7, wherein the wave body comprises a footprint having an area, $A_{FP}$, and the first cutout and the second cutout comprise a total cutout area, $A_{TCO}$, and wherein $A_{TCO} \leq A_{FP}$.

18. The tolerance ring of claim 17, wherein $A_{TCO} \geq 25\% \ A_{FP}$.

19. The tolerance ring of claim 7, wherein each cutout comprises an inner arcuate edge adjacent to the wave body, wherein each arcuate edge comprises an arc length, $L_{AE}$, and each wave body comprises a footprint having a height, $H_{WBF}$, and wherein $L_{AE}$ is $\geq H_{WBF}$.

20. The tolerance ring of claim 19, wherein $L_{AE}$ is $\leq 200\% \ H_{WBF}$.

\* \* \* \* \*